United States Patent [19]

Takamatsu et al.

[11] Patent Number: 4,790,510
[45] Date of Patent: Dec. 13, 1988

[54] SLUSH MOLD

[75] Inventors: Shigeki Takamatsu, Toyota; Yoshio Taguchi, Nagoya; Takeshi Kato, Toyota, all of Japan

[73] Assignee: Toyota Jidosha Kabushiki Kaisha, Toyota, Japan

[21] Appl. No.: 910,690

[22] Filed: Sep. 23, 1986

[51] Int. Cl.⁴ ............................................. B29C 33/02
[52] U.S. Cl. ..................................... 249/117; 249/137; 249/161; 264/302; 264/327; 264/DIG. 60; 425/256; 425/435
[58] Field of Search ....... 264/302, 301, 310, DIG. 60, 264/327; 425/182, 435, 580, 404, 446, 256; 249/78, 79, 80, 81, 137, 117, 205, 129, 161

[56] References Cited

U.S. PATENT DOCUMENTS

| 2,738,434 | 6/1956 | Amo | 249/161 |
| 3,565,986 | 2/1971 | Byall | 264/302 |
| 3,671,168 | 6/1972 | Nussbaum | 249/79 |
| 4,049,767 | 9/1977 | Uaidya | 264/269 |
| 4,606,868 | 8/1986 | Christoph et al. | 264/302 |
| 4,610,620 | 9/1986 | Gray | 425/435 |
| 4,634,360 | 1/1987 | Gray | 425/435 |

FOREIGN PATENT DOCUMENTS 58-208865 6/1985 Japan .
58-247554 7/1985 Japan .

Primary Examiner—Jay H. Woo
Assistant Examiner—C. Scott Bushey
Attorney, Agent, or Firm—Finnegan, Henderson, Farabow, Garrett & Dunner

[57] ABSTRACT

A slush mold for molding film moldings such as surface coverings of interior finishing parts of automotive vehicles. The slush mold comprises a mold body having a molding surface of a predetermined shape formed in the inner surface thereof, a skirt capable of being detachably joined to the mold body so as to cover the marginal portion of the inner surface of the mold body other than the molding surface so that a resin film molding is formed only over the molding surface, and guide members for guiding the skirt so that the skirt is joined correctly to the mold body. Thus, the molding material is distributed only over the molding surface, and thereby the yield rate of film moldings is improved and the work in the subsequent process is facilitated.

15 Claims, 3 Drawing Sheets

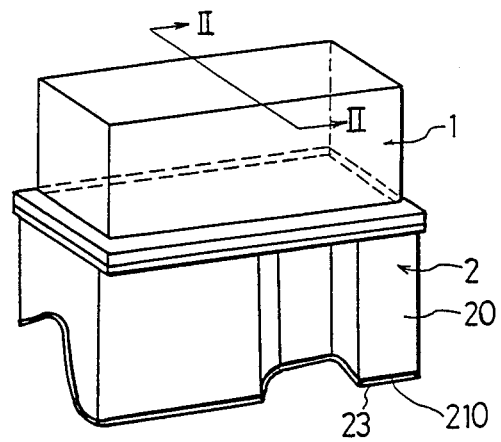
FIG. 1
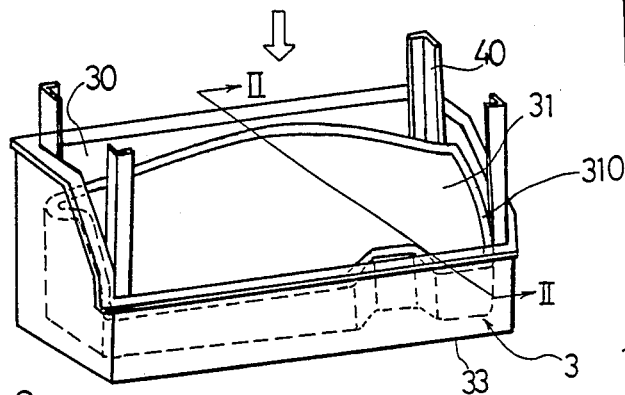
FIG. 2
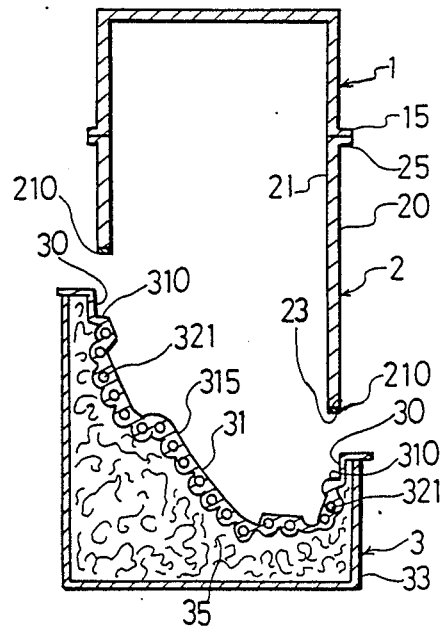
FIG. 3
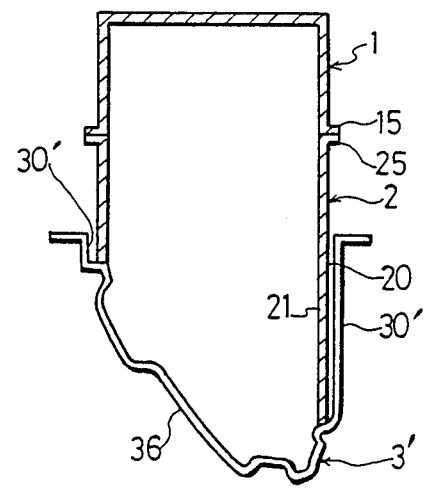

4,790,510

SLUSH MOLD

BACKGROUND OF THE INVENTION

1. Field of the Invention

The present invention relates to a slush mold for the improvement of the yield rate and the production efficiency of slush molding processes.

2. Description of the Prior Art

In a slush molding process, a resin material fed over the molding surface of a heated slush mold is melted into a molten resin film, and then the molten resin film is cooled to obtain a film-like molding. Surface coverings of the interior finishing parts of automotive vehicles are manufactured by slush molding.

FIGS. 8 and 9 illustrate a conventional slush mold 301 and a reservoir 101 for feeding a resin material to the slush mold 301. In a conventional slush molding process, the molding surface 311 of the slush mold 301 is heated by heating means such as heating oil pipes 321, and then a material S stored in the reservoir 101 is fed over the molding surface 311 by dropping naturally by virtue of gravity. Then the respective sealing surfaces 100 and 300 of the reservoir 101 and the slush mold 301 are joined flush. As illustrated in FIG. 9, the molding surface 311 is not formed over the entire inner surface of the slush mold 301; marginal surfaces E and F (not the part of the molding surface) are formed along the periphery of the molding surface 311. Since the reservoir 101 and the slush mold 301 are joined flush along the sealing surfaces 100 and 300, the material S fed from the reservoir 101 is distributed to the molding surface 311 as well as non-molding part of the marginal surfaces E and F, which wastes the material and reduces the yield rate of the slush molding. The configuration of the molding surface 311 relative to the inner surface of the slush mold 301 may be changed in order to improve the yield rate by reducing the amount of the material S that is fed over the marginal surfaces E and F. However, such a change of the configuration of the molding surface 311 is possible to make the drafting of the slush molding difficult or to deteriorate the distribution of the material to undercut portions in the molding surface 311. According to a known method of improving the yield rate, the marginal surfaces E and F are covered with heat insulating jackets 322 and inserts 323 to suppress the adhesion of the molten material over the surfaces of the inserts 323 corresponding to the marginal surfaces E′ and F′. However, such a method is not enough to prevent the temperature increase at the inserts 323 and it lets the adhesion of the molten or half molten material to the surfaces of the inserts 323. The adhesion of the molten or half molten material to the surfaces of the inserts 323 requires additional time and labor for removing the molten material from the mold, and the half molten material is often mixed in the material stored in the reservoir 101, which deteriorates the stored material.

SUMMARY OF THE INVENTION

Accordingly, it is an object of the present invention to provide a slush mold capable of efficiently producing slush moldings at a satisfactory yield rate.

According to the present invention, the marginal surfaces E and F of a slush mold are covered with members formed of a material different from that of the slush mold 301 to solve the above-mentioned problems of the conventional slush mold.

A slush mold according to the present invention comprises a mold body having a molding surface of a predetermined shape; a skirt capable of being detachably joined to the mold body so as to cover at least a marginal surface merging into the molding surface; and quide members associated with both the mold body and the skirt to determine the relative position of the mold body and the skirt.

The mold body may be a conventional slush mold having a molding surface to be heated from the backside thereof by heating means, such as flames, hot air, a fluidized bed heating medium or a hot liquid heating medium. The skirt may be formed at the lower end of the reservoir as an integral part of the reservoir which is for storing the material and feeding the same to the mold body. Or the skirt may also be formed of a separate member from the reservoir. It is preferable to form the skirt with a material having a thermal conductivity smaller than that of the material forming the mold body to prevent the adhesion of the molten material to the inner surface of the skirt.

The guide member guides the skirt to cover the marginal surface parts and determines the mold body and the skirt in the relative position of the mold body and the skirt. The guide member may be incorporated into either the mold body or the skirt. It is also possible to join the mold body and the skirt correctly by inserting the positioning pins in through holes formed in a flange formed in the upper periphery of the mold body and in a flange formed in the upper periphery of the skirt.

Since the marginal surfaces which do not participate in forming a molding (surfaces E and F in FIG. 9) are covered with the skirt, the molten material will not adhere to the marginal surfaces, and hence the yield rate in manufacturing slush moldings is improved. The mold body may consist of a molding box and a mold member which is held within the molding box.

The above and other objects, features and advantages of the present invention will be described hereinafter in conjunction with the accompanying drawings.

BRIEF DESCRIPTION OF THE DRAWINGS

FIG. 1 is a perspective view showing a slush mold and a reservoir employed in combination with the slush mold in a preferred embodiment according to the present invention;

FIG. 2 is an end elevation view taken on line II—II in FIG. 1;

FIG. 3 is an end elevation view of a slush mold in another embodiment according to the present invention;

FIGS. 4 to 7 are illustrations to assist in explaining an exemplary slush molding process in which FIG. 4 shows a mold body 3′ is coupled with a reservoir 1′ and a skirt 2 and heated by a heating medium, FIG. 5 shows the material S is fed over the heated molding surface 315, FIG. 6 shows the mold body 3′ which is separated from the reservoir 1′ and the skirt 2 and then is turned upside down to drop the surplus unmelted material naturally on a material recovering unit 8, and FIG. 7 shows cooling water W is sprayed through a cooling device 9 against a resin film S1;

DESCRIPTION OF THE PREFERRED EMBODIMENTS

Figure 4:
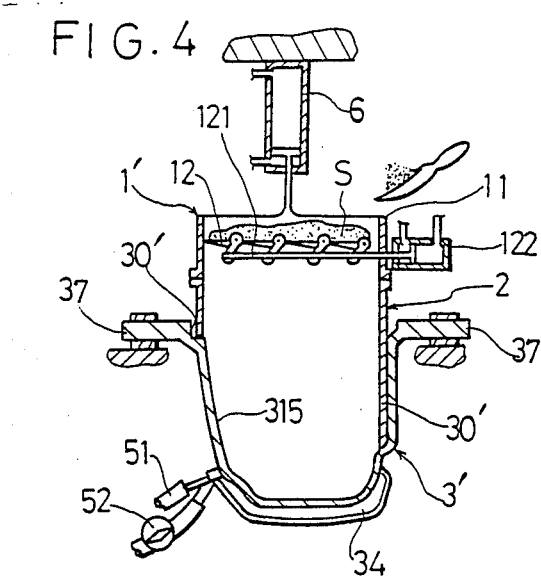

FIG. 1 is a perspective view which illustrates a slush mold comprising a mold body 3 and a skirt 2, and a reservoir 1 joined to the upper end of the skirt 2. FIG. 2 also shows an end elevation view taken on line II—II in FIG. 1. The mold body 3 comprises a molding box 33 and a mold member 31 fitted in the molding box 33. A molding surface 315 is formed in the inner surface of the mold member 31. Along the inside corners of the molding box 33, guide means 40 is provided for guiding the outer surface 20 of the skirt 2 along the upper inner surface 30 of the molding box 33. The lower edge 210 of the skirt 2 is correctly led to fit to the upper edge 310 of the mold member 31 by the guide means 40. The lower edge 210 of the skirt 2 and the upper edge 310 of the mold member 31 are formed so as to be in sealing contact with each other. The upper end of the skirt 2 is joined flush with the lower end of the reservoir 1. Heating oil pipes 321 are arranged along the backside of the mold member 31. Hot oil is circulated through the heating oil pipes 321 to heat the mold member 31, hence, the molding surface 315 is at a predetermined temperature. The space formed between the mold member 31 and the molding box 33 is packed with a heat insulating material 35, such as glass wool. A sealing member 23 for sealing the joint of the lower edge 210 of the skirt 2 and the upper edge 310 of the mold member 31 is fabricated by using a female model used for forming the mold body 3 or by transferring a layer of sheet wax applied to the upper edge 310 of the mold member 31 in the desired thickness as the sealing member 23. In this embodiment, the reservoir 1 and the skirt 2 are fabricated by separate members and are assembled in a single unit. Accordingly, the reservoir in the present invention can be used with the skirt replaced with another one. That is, when another mold body is used, a skirt which fits to the new mold body is combined with the reservoir used with the previous skirt.

Referring to FIG. 3, a slush mold in a second embodiment according to the present invention comprises a mold body 3', a skirt 2, and a reservoir 1 joined to the upper end of the skirt 2. This slush body 3' is not provided with any molding box, heating oil pipes or heat insulating material. Accordingly, the mold body 3' is immersed in a fluid to heat the same from the backside 36 thereof in an oil bath, a fluidized bed furnace or a salt bath. In this process of the embodiment, in order to prevent the leak of the heating fluid into the mold, the mold body 3' has a comparatively large wall 30'.

Figure 5:
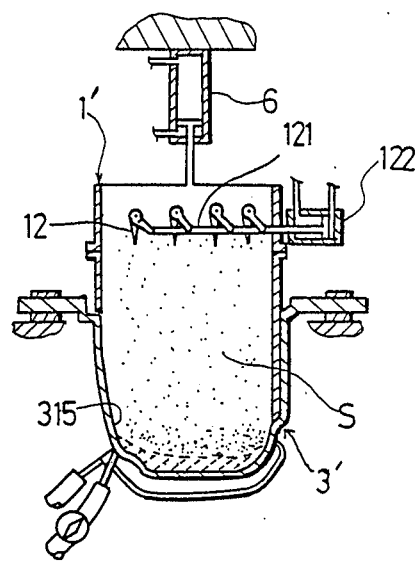
Figure 6:
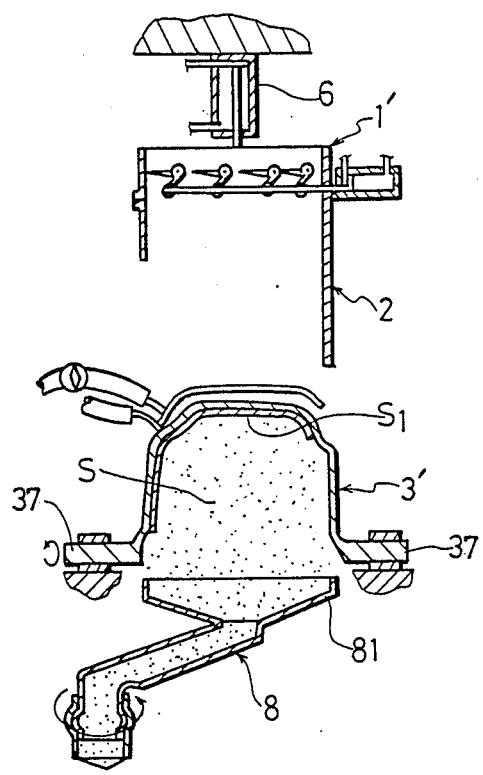
Figure 7:
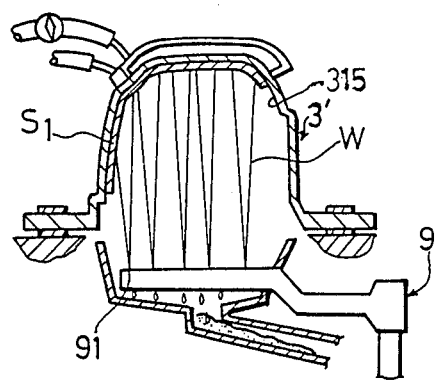
Figure 8:
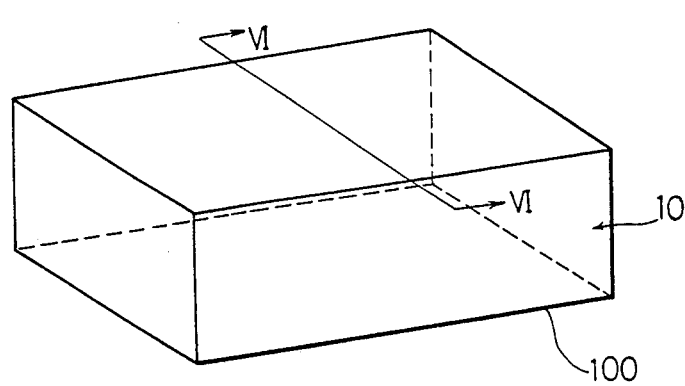
FIG. 8 is a perspective view of a conventional slush mold.
Figure 9:
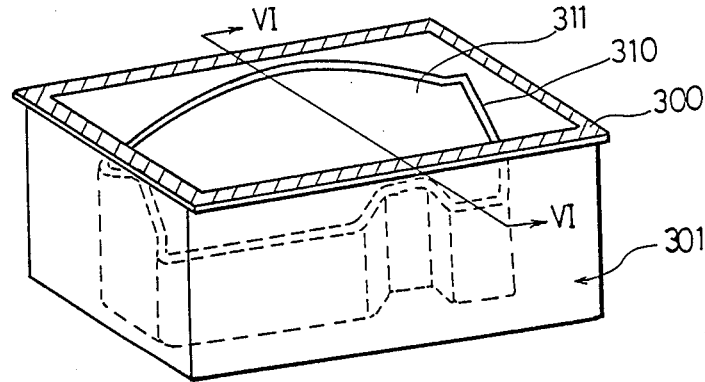
FIG. 9 is an end elevation view taken on line VI—VI in FIG. 8.
Figure 10:
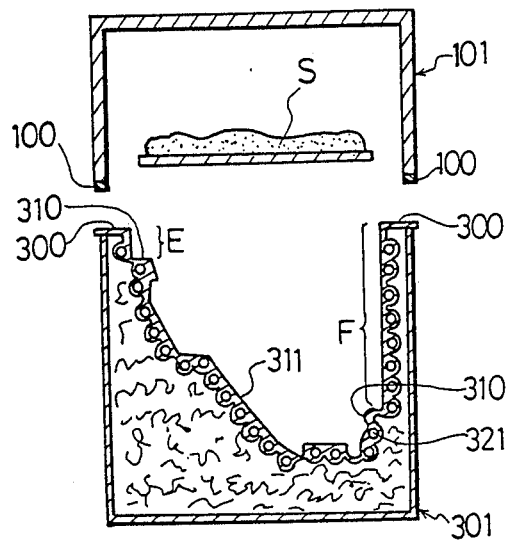
FIG. 10 is an end elevation view of another conventional slush mold.

A slush molding method, by way of example, employing the slush mold according to the present invention will be described hereinafter with reference to FIGS. 4 to 7. First, the molding surface 315 of the mold body 3' is heated at 210° C. In the case of the example shown in FIG. 4, a heating medium is supplied into a closed space 34 through a heating medium supplying pipe 51 (and later discharged through a discharge pipe 52). When the slush mold of FIGS. 1 and 2 is employed, heating oil heated at a temperature on the order of about 250° C. is circulated through the heating oil pipes 321 to heat the mold body 3. Then, the skirt 2 is fitted in the mold body 3' so as to cover the upper inner surface 30', namely, the marginal surface not having any part of the molding surface 315, as illustrated in FIG. 4. In fitting the skirt 2 in the mold body 3', the skirt 2 is guided by the guide means 40. Then, the piston rod 121 is moved by a shaking unit 122 reciprocating to make the material S on the bottom plate 12 of the reservoir 1' drop over the molding surface 315 by gravity as illustrated in FIG. 5. The piston rod 121 is reciprocated for seven to eight seconds. The material S thus distributed over the molding surface 315 of the mold body 3' is molten and the molten material spreads over the molding surface 315. Then, as illustrated in FIG. 6, the mold body 3' is turned upside down on a shaft 37 to make the unmelted surplus material S drop by gravity into the hopper 81 of a material recovering unit 8. The skirt 2 and the reservoir 1' are separated from the mold body 3' by being lifted up by a lifting device 6 before the mold body 3' is turned upside down. The material recovering unit 8 is not necessarily provided; the surplus material S may be recovered into the reservoir 1' by placing the reservoir 1' under the mold body 3'. Then, as illustrated in FIG. 7, cooling water W is sprayed through the nozzles 91 of a cooling device 9 against a resin film S1 formed over the molding surface 315 of the mold body 3' to cool the resin film S1. When the slush mold of FIGS. 1 and 2 is employed, oil heated at a low temperature, for example on the order of 50° C. is circulated through the heating oil pipes 321 to cool the resin film. A film molding is obtained when the resin film S1 is cooled to a temperature in the range of 60° to 70° C. After the film molding has thus been cooled, the film molding is withdrawn from the mold body 3'.

It was found through experimental molding operations that the slush mold of the present invention is more capable of improving the yield rate than the conventional slush mold. The results of the experimental molding operation are shown in Table 1.

TABLE 1

|  | Present Invention | Prior Art |
| --- | --- | --- |
| Weight of material spent (g) | 950 | 1350 |
| Weight of semifinished molding (g) | 760 | 760 |
| Weight of finished molding (g) | 690 | 690 |
| Average film thickness (mm) | 1.0 | 1.0 |
| Yield rate (%) | 73 | 51 |

As is apparent from what has been described hereinbefore, according to the present invention, part of the inner surface of the mold body other than the molding surface, namely, the marginal surface of the mold body, is covered with the skirt detachably joined to the reservoir so that the molten material will spread only over the molding surface, which improved the yield rate of slush moldings. Furthermore, since the marginal surface in the inner surface of the mold body is covered with the skirt, the molding surface can be formed in an optimum area in the inner surface of the mold body having no regard for yield rate which ensures satisfactory molding operation and facilitates the withdrawal of the molding.

Still further, since the sealing member for sealing the joint of the skirt and the mold body is formed through a transfer process or by using a female model for fabricating the mold body, the sealing member seals the junction satisfactorily. Since the film molding having fewer burrs can be formed at a high yield rate, the film molding formed in the slush mold of the present invention need not be rimmed in the subsequent foaming process.

Although the invention has been described in its preferred form with a certain degree of particularity, it is to be understood that many variations and changes are possible in the invention without departing from the scope and spirit thereof.

What is claimed is:

1. A slush mold comprising:
   a mold body having a molding surface and a flange surface, said molding surface including a molding portion and a marginal portion, said marginal portion being adjacent to and surrounding said molding portion at a peripheral edge of said molding portion;
   a skirt detachably joined to said mold body in a molding position, said skirt having an interior portion defined by a lower edge of said skirt, said lower edge contacting said peripheral edge of said molding portion so that said molding portion is within said interior portion and said marginal portion is outside said interior portion when said skirt is joined to said mold body; and
   guide means operatively coupled to said mold body and said skirt for guiding said mold body and said skirt during relative joining movements of said mold body and said skirt when said mold body and said skirt are detached to cause said lower edge of said skirt to contact said peripheral edge of said molding portion when said mold body and said skirt are joined in said molding position.

2. A slush mold as recited in claim 1, wherein at least one of said lower edge of said skirt and said peripheral edge of said mold body includes a sealing member.

3. A slush mold as recited in claim 1, wherein said skirt includes a material having a thermal conductivity smaller than that of material forming said mold body.

4. A slush mold as recited in claim 1, wherein said mold body is contained in a molding box having a heat insulating material.

5. A slush mold as recited in claim 8, wherein said heat insulating material includes glass wool.

6. A slush mold as recited in claim 1, wherein said guide means includes at least one guide member.

7. A slush mold as recited in claim 6, wherein said guide members are rigidly mounted to said mold body and movably coupled to said skirt.

8. A slush mold as recited in claim 1, further comprising means in communication with said interior portion of said skirt for providing molding material to said molding portion.

9. A slush mold as recited in claim 8, wherein said molding material providing means includes a reservoir.

10. A slush mold as recited in claim 9, wherein said skirt is formed integrally with said reservoir.

11. A slush mold as recited in claim 9, wherein said skirt is detachably joined to said reservoir.

12. A slush mold as recited in claim 1, further comprising means operatively coupled to said mold body for moving said mold body to promote removal of molding material from said molding portion.

13. A slush mold as recited in claim 12, wherein said moving means includes a shaft operatively coupled to said mold body about which said mold body can be rotated.

14. A slush mold as recited in claim 1, further comprising means for providing heat to said molding portion.

15. A slush mold as recited in claim 14, wherein said heating means includes heating oil pipes.

* * * * *

UNITED STATES PATENT AND TRADEMARK OFFICE
CERTIFICATE OF CORRECTION

PATENT NO. : 4,790,510
DATED : December 13, 1988
INVENTOR(S) : TAKAMATSU ET AL.

It is certified that error appears in the above-identified patent and that said Letters Patent is hereby corrected as shown below:

Claim 5, line 1, change "8" to -- 4 --.

Signed and Sealed this

Eleventh Day of July, 1989

Attest:

DONALD J. QUIGG

Attesting Officer

Commissioner of Patents and Trademarks